March 26, 1963  M. M. SHERIFF ET AL  3,082,851
ACCELERATOR PEDAL CONTROLLED AIR BRAKE SYSTEM FOR VEHICLES
Filed Aug. 22, 1958  2 Sheets-Sheet 1

Merle M. Sheriff
Francis J. Holland
INVENTORS

BY Oliver D. Olson
Agent

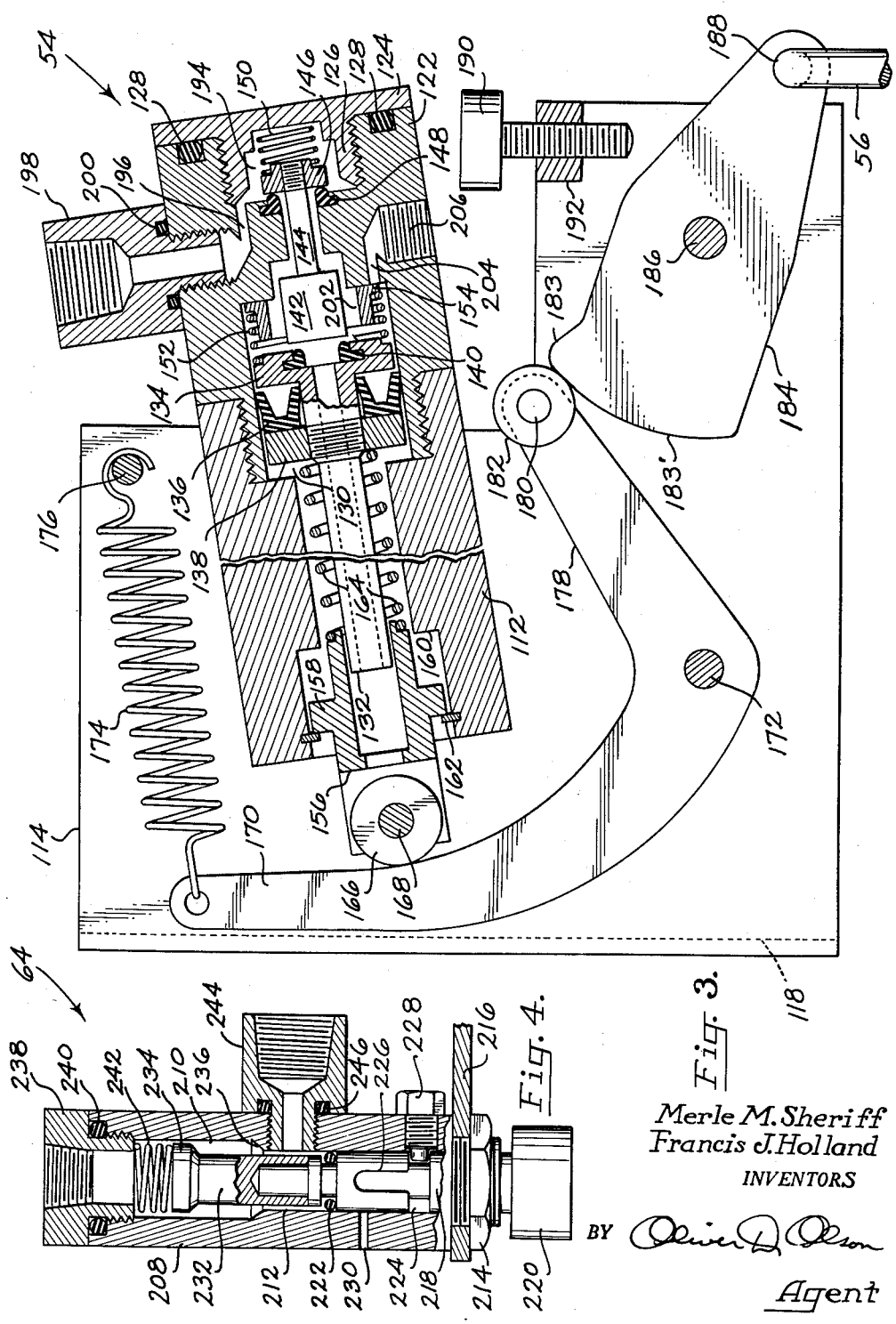

3,082,851
ACCELERATOR PEDAL CONTROLLED AIR
BRAKE SYSTEM FOR VEHICLES
Merle M. Sheriff, Minoa, and Francis J. Holland, Syracuse, N.Y.; said Sheriff assignor to said Holland
Filed Aug. 22, 1958, Ser. No. 756,682
16 Claims. (Cl. 192—3)

This invention pertains to air brake systems for vehicles, and relates particularly to an air brake system which may be controlled from the conventional accelerator pedal of a vehicle.

The use of air brakes is particularly desirable and advantageous in trucks and other large and heavy vehicles adapted for carrying heavy loads, for in such types of vehicles it is essential that adequate means be provided for stopping in a minimum of distance.

On the other hand, all brake systems presently available, including air brakes, are characterized by a fundamental fallibility, namely their performance is dependent upon and therefore limited by the actions and reactions of the person using them. Accordingly, although their performance is adequate when the driver has ample time to plan his braking action, they are wholly inadequate under the critical condition of emergency when the driver must make an unplanned stop safely and in the shortest distance possible.

For example, air brakes presently available and in use are controlled from a brake pedal located some distance from the accelerator pedal of the vehicle, thus requiring the driver to move his foot and leg to the extent required to transfer pressure from the accelerator to the brake pedal. It has been determined that although persons of normal physical fitness and reflex react by reflex under emergency conditions to release pressure on the accelerator pedal almost instantly, still they require a time of approximately ¾ of one second to transfer the foot to the brake pedal. The significance of this time interval is more fully appreciated when it is realized that during this time the distance travelled by a vehicle is, for example, 33 feet at 30 miles per hour, and proportionately greater at higher speeds. Thus, even when considered apart from the problem of braking the substantial inertia of a large vehicle, the delay of ¾ of one second before braking effort is applied, represents a serious determent to the safe operation of such vehicles.

Another equally important factor in the safe operation of a vehicle, is the ability to brake the vehicle to a stop with a minimum distance, while maintaining maximum control of the vehicle. It has been determined, on the other hand, that under the panic conditions of unplanned or emergency stops a driver impulsively applies maximum leg power to the brake pedal. With air brake systems presently available, such application of leg power to the brake pedal results in the application of braking pressures of such excessive magnitude as to cause skidding of the wheels, thereby lengthening the stopping distance and reducing driver control over the vehicle.

It has been determined that the braking of a vehicle in a minimum of distance is achieved when the braking effort applied to the wheels is such as to provide a condition of impending skidding. This condition is further desirable since it retains to the driver complete control over the vehicle, and thus avoids the extreme hazards accompanying the condition of skidding. It has been determined further, that the braking effort resulting in the condition of impending skidding, varies with the physical condition of the roadway. Thus, greater braking pressure is required for impending skidding in dry concrete pavement than on wet asphalt pavement, and even less is required on icy pavement.

However, air brakes presently available do not provide any means by which to prevent impulsive overbraking by the driver, but on the contrary permit the development of braking pressures which result in uncontrolled skidding on all types of roadways and under all types of conditions.

Accordingly, it is a principal object of the present invention to provide an air brake system which is operable from the accelerator pedal of a vehicle, whereby to avoid the time required with conventional air brake systems for transferring the foot from the accelerator pedal to a brake pedal.

Another important object of this invention is the provision of an air brake system in which the maximum fluid pressure to the braking components may be adjusted to the condition of impending skidding, whereby to eliminate the hazards normally attending impulsive overbraking by a driver.

Still another important object of this invention is to provide an air brake system in which the maximum fluid pressure to the braking components may be adjusted over a range to provide the condition of impending skidding under various types and conditions of roadways.

A further important object of the present invention is to provide an air brake system which may be readily integrated with a conventional air brake system to provide accelerator pedal control for the brakes and yet permit use of the conventional brake system whenever desired.

A still further important object of this invention is the provision of an air brake system which is of simplified construction for economical manufacture, which is precise in its operation and which is operable with a minimum of maintenance and repair.

Another important object of this invention is the provision of an air brake system for vehicles, in which system may be incorporated means for setting the brakes automatically, as for parking, when the vehicle engine is shut off.

The foregoing and other objects and advantages of this invention will appear from the following detailed description, wherein reference is made to the accompanying drawings in which.

Figures 1, 2:
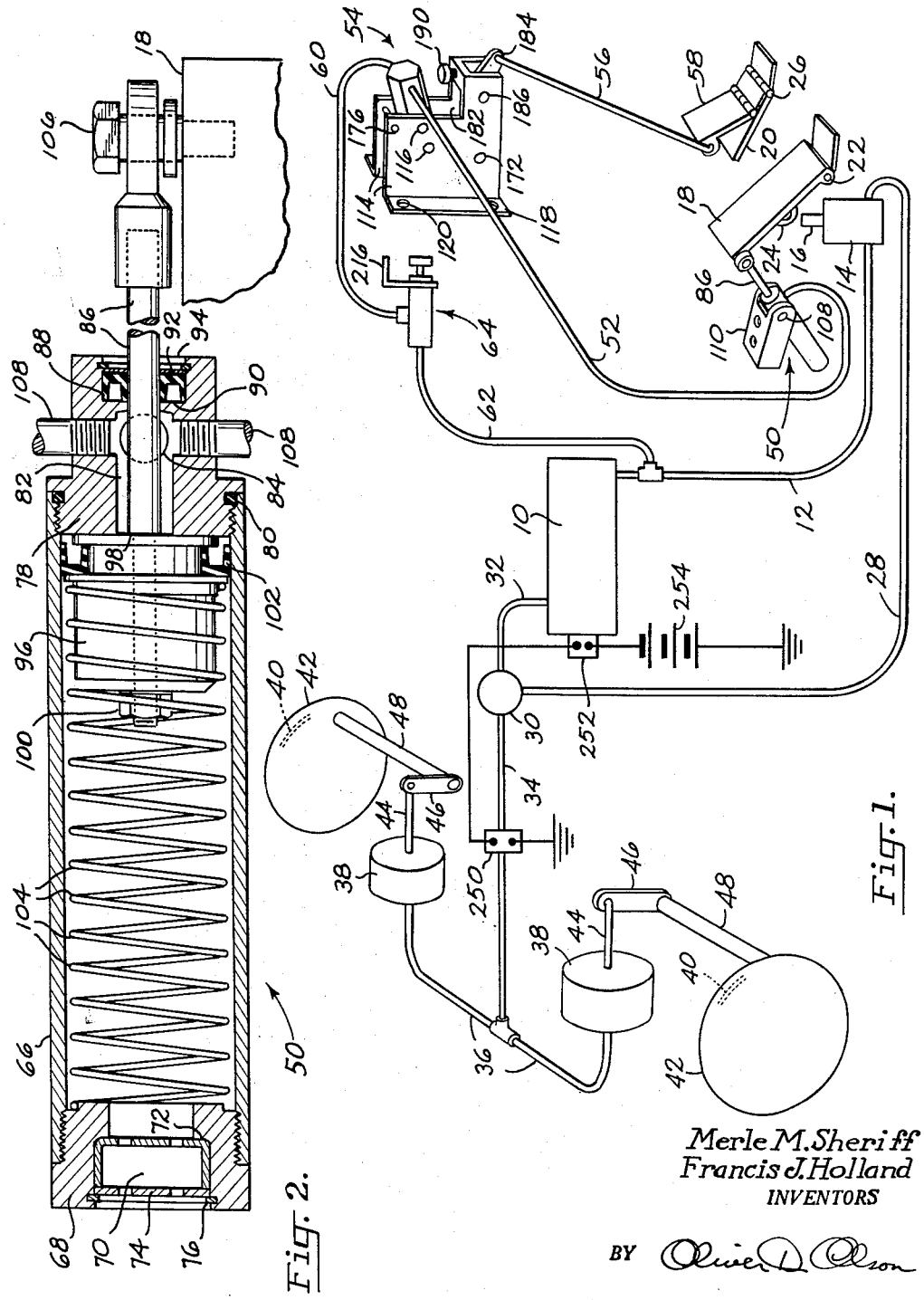
FIG. 1 is a schematic view of a conventional air brake system having integrated therewith an accelerator pedal controlled brake system embodying features of the present invention.
FIG. 2 is a central longitudinal sectional view of a power unit embodying features of this invention and adaptable for use in the brake system shown in FIG. 1.

FIG. 3 is a foreshortened central longitudinal sectional view of a sensing valve embodying features of the present invention and adapted for use in the brake system shown in FIG. 1, the right hand fragmentary portion of the valve body being rotated 90° for more detailed disclosure, and FIG. 4 is a central longitudinal sectional view of a switching valve embodying features of this invention and adapted for use in the brake system shown in FIG. 1.

Referring to FIG. 1, the conventional air brake system includes an air supply reservoir 10 which is maintained at a predetermined air pressure by a conventional air compressor associated with a vehicle engine (not shown). An air line 12 connects the reservoir to the inlet of an air brake valve 14, the control plunger 16 of which is operated by a brake pedal 18 pivoted or otherwise mounted for movement relative to the vehicle body and positioned conventionally adjacent the accelerator pedal 20. In the embodiment illustrated, the brake pedal is mounted on the vehicle body by pivot pin 22, and a roller 24 is mounted on the brake pedal and positioned by engaging the valve control plunger 16. The accelerator pedal 20 is secured to the vehicle body and pivoted on hinge 26.

The outlet of the air brake valve 14 is connected through air line 28 to a relay valve 30, which is also connected through air line 32 to the reservoir 10. The output of the relay valve is connected through air lines 34 and 36 to the air brake actuators 38 associated with the brake shoes 40 and brake drums 42 of each of the vehicle wheels. In the embodiment illustrated, each of these actuators is an air cylinder unit, the piston rod 44 of which is pivotally connected to one arm 46 of a bell crank, the other arm 48 of which operates to expand the brake shoes against the brake drums.

In the operation of the conventional air brake system, depression of the brake pedal 18 operates the air brake valve 14 to supply to the relay valve 30 an air pressure signal which is a function of the brake pedal position. The relay valve, in turn, supplies a corresponding air pressure from the reservoir 10 to the actuators 38 to provide a corresponding braking effort at the wheels of the vehicle.

In accordance with the present invention, there is integrated with the conventional air brake system, a parallel air brake system which is operable from the accelerator pedal 20 of the vehicle engine. This system includes an air power unit 50 which is connected to the conventional brake pedal 18 for operating the latter by air pressure, rather than by foot pressure supplied by the driver. Air pressure to the power unit is supplied through an air line 52 leading from a sensing valve 54 which is operated through a link 56 pivotally connected to an overlay pedal 58 mounted pivotally upon the conventional accelerator pedal of the vehicle engine.

The input to the sensing valve is connected through air lines 60 and 62 to the air supply reservoir 10. As explained more fully hereinafter, these lines may be interconnected by a switching valve 64, conveniently mounted at the dash panel of a vehicle body for selectively switching the accelerator pedal controlled brake system into and out of the main air brake system.

*Power Unit*

Referring to FIG. 2 of the drawings, the power unit 50 includes an elongated hollow cylinder 66 which is fitted at one end, by means of interengaging threads, with a hollow end closure 68 in which an air filter 70 is removably confined between the shoulder 72 and a perforated washer 74, the latter being backed by a snap ring 76.

The opposite end of the cylinder 66 also removably receives the end closure 78, by means of interengaging threads which are sealed by the annular sealing ring 80. This end closure is provided with a longitudinal bore 82 and a radial tapped opening 84 communicating therewith. The longitudinal bore receives the elongated piston rod 86 freely therethrough, and a cup seal 88 is confined between a shoulder 90 and a spacer ring 92 backed by the snap ring 94, to seal the space between the bore and piston rod adjacent the outer end of the longitudinal bore.

A piston 96 is mounted slidably within the cylinder 66 and is connected to the piston rod 86 between the shoulder 98 and securing nut 100. A cup seal 102 is confined within an annular groove in the piston and functions with the first mentioned cup seal 88 to form an air pressure chamber 82 therebetween. A helical spring 104 is contained within the cylinder 66 and abuts at one end against the end closure 68 and at the opposite end against the piston 96, whereby normally to urge the piston to the right, into abutment with the end closure 78.

The projecting end of the piston rod 86 is connected pivotally to the air brake pedal 18 of the vehicle, as by means of the pivot bolt 106. The end closure 78 of the cylinder is provided with a pair of diametrically disposed outwardly projecting pins 108 which support the power unit pivotally upon a bracket 110 adapted to be secured to a vehicle body adjacent the conventional air brake pedal, as illustrated in FIG. 1.

*Sensing Valve*

Referring now to FIG. 3 of the drawings, the sensing valve 54 includes a hollow body 112 which is secured between spaced brackets 114 as by means of the screws 116 (FIG. 1). One or more mounting flanges 118 project from the brackets 114 for securing the sensing valve to the fire wall of the vehicle body above the accelerator pedal 20, as by means of bolts extended through the openings 120. A hollow valve head 122 is releasably secured at one end to one end of the body 112 as by means of the interengaging threads illustrated, and the opposite end of the valve head 122 is closed by the cap 124, by means of interengaging threads provided on the valve head and on the hollow central boss 126 provided on the cap. An annular sealing ring 128 is interposed between the valve head and cap to form an airtight seal.

Mounted slidably within the chamber 130 formed in the valve head and valve body is a hollow stem 132 formed at one end with an enlarged piston head 134. A cup seal 136 is confined between the stem head 134 and a backing nut 138 threaded onto the stem 132. The forward end of the stem head 134 carries an annular check seal 140 which cooperates with the enlarged end 142 of a seat pin 144 mounted freely within the valve head 122. The reduced end of the seat pin is threaded to receive the second valve seat 146 arranged for cooperation with the check seal 148 mounted within the valve head 122 and surrounding the seat pin. A helical spring 150 is interposed between the cap 124 and the valve seat 146 to urge the seat pin assembly normally to the left for sealing engagement of the valve seat 146 against its check seal 148.

A light spring 152 is interposed between the stem head 134 and the valve head 122, being positioned by the guide sleeve 154, for normaly urging the stem toward the left to displace the valve seat 142 from its check seal 140.

A hollow stem sleeve 156 freely encircles the stem 132 and is provided with an annular shoulder 158 by which the sleeve is guided within the valve body 112 between the limits defined by the shoulder 160 and the snap ring 162. A helical spring 164 encircles the stem and abuts at one end against the nut 138 and at the opposite end against the inner end of the sleeve 156.

A roller 166 is mounted on the outer end of the stem sleeve 156, as by means of the pin 168, and this roller is positioned to bear against one arm 170 of a bell crank lever which is mounted between the brackets 114 on the pivot pin 172. A coil spring 174 is attached at one end to the bell crank lever arm 170 and at the opposite end to a pin 176 secured to the brackets 114, and functions to urge the bell crank arm against the roller.

The other arm 178 of the bell crank lever is provided at its free end with a pin 180 on which the second roller 182 is mounted. This roller is arranged to engage both the irregular contoured surface 183 and the constant radius surface 183' of a cam member 184 mounted pivotally between the brackets on pivot pin 186, the latter defining the center of the constant radius surface 183'. Means, such as the hole 188, is provided in the opposite end of the cam member for pivotal attachment of the link 56 which is connected pivotally at the opposite end to the overlay pedal 58. Movement of the cam member in one direction is limited by means of the adjustment screw 190 which is threaded into a tapped hole in the transverse member 192 interconnecting the spaced brackets 114.

The air pressure supply chamber 194 communicates through port 196 with a lateral tapped opening adapted to receive the fitting 198 for connection of the air supply line 60. An airtight seal is provided between the fitting and valve head by means of the ring seal 200.

The controlled air pressure chamber 202 communicates through port 204 with a lateral tapped opening 206 adapted for connection of the air line 52 which leads to the inlet of the power unit 50.

Switching Valve

Referring now to FIG. 4, the switching valve 64 comprises a hollow body 208 defining the enlarged longitudinal bore 210 and the continuing bore 212 of smaller diameter. One end of the body is reduced in diameter and externally threaded for reception of the securing nut 214, by which the switching valve may be mounted upon a support, such as the bracket 216 illustrated in FIG. 1. Mounted slidably within the smaller bore 212 of the body is a control shaft 218, the outer end of which is provided with an enlarged knob 220. The control shaft is provided with an annular groove adjacent its inner end, and this groove receives an annular sealing ring 222 by which to form an airtight seal between the shaft and bore. A second annular groove 224 is provided in the control shaft adjacent the outer end of the latter, and this groove communicates with a longitudinal groove 226 in the shaft, said groove extending toward the inner end. A guide pin 228 is mounted removably in the body 208, with its inner end projecting into the smaller bore 212 for reception within the grooves 224, 226 formed in the control shaft 218. A lateral opening 230 in the body connects the smaller bore with the atmosphere.

The inner end of the control shaft 218 is reduced in diameter for reception within the hollow end of a valve stem 232, the enlarged head end 234 of which is contained freely within the larger bore 210 of the body. The valve head 234 is adapted, in one position of adjustment of the control shaft 218, to be moved toward the right into air sealing abutment with the valve seat 236 formed at the shoulder between the bore sections. In this position of adjustment of the control shaft, the annular seal 222 mounted thereon is displaced to the right of the lateral air opening 230. A hollow fitting 238 is removably attached to the body at the end containing the larger bore, as by means of the interengaging threads which are sealed by the sealing ring 240. A helical spring 242 is interposed between the inner end of the fitting and the valve head, whereby to urge the latter toward the right. This hollow fitting is threaded internally for connection of the air line 62 leading from the reservoir 10.

A lateral tapped opening is provided in the body adjacent the valve seat 236 and to the left of the inwardmost position of the annular sealing ring 222 and this opening receives the hollow fitting 244 which functions to connect the air line 60 leading to the inlet of the sensing valve 54. An airtight seal is provided between the fitting and body by means of the annular sealing ring 246.

In the position of the control shaft 218 shown in FIG. 4, air pressure from the supply passes through fitting 238 and around the valve head 234 and stem 232 into the outlet fitting 244 to the sensing valve. The sealing ring 222 on the control shaft, being displaced to the left of the lateral opening 230 seals the inlet air pressure from said opening.

When it is desired to disconnect the air pressure supply from the sensing valve 54, the control knob 220 is rotated until the longitudinal groove 226 aligns with the pin 228, whereupon the force exerted by the spring 242 and by the air pressure against the valve head 234, causes the valve and control shaft to be moved toward the right until the valve head 234 seals against the valve seat 236. In this position of adjustment, the annular sealing ring 222 is displaced to the right of the exhaust opening 230, whereby any air pressure contained in the outlet line 60, is permitted to seep around the valve stem 232 and be exhausted to the atmosphere through opening 230, thereby relieving the air pressure in the sensing valve.

Automatic Parking Brake

Referring again to FIG. 1 of the drawings, there is shown as another feature of the present invention, an automatic parking brake associated with the conventional air brake system. In this arrangement a solenoid operated check valve 250 is inserted in the air pressure line 34 leading to the actuators 38, and an air pressure switch 252 also is inserted in the air pressure system, preferably at the reservoir 10. The air pressure switch is normally closed when the air pressure reacting on it is below an adjustable predetermined value, and is opened when the air pressure exceeds the predetermined amount. The switch is included in a series electrical circuit which includes the solenoid operated check valve and the vehicle battery 254. Thus when the air pressure switch is closed it completes the circuit of the check valve to close the air pressure line 34 leading back from the actuators to the relay valve 30.

Assuming, for example, that the air pressure reservoir 10 is normally maintained at an air pressure of about 90 p.s.i. when the vehicle engine is in operation and that the air pressure switch 252 is adjusted to open when the air pressure in the reservoir decreases to about 30 p.s.i., the operation of the brake lock is as follows: When the vehicle engine is started and the air pressure in the reservoir rises to about 90 p.s.i., the air pressure switch remains open. Thus, the electric circuit of the solenoid operated check valve 250 is opened, and maximum air pressure is available for operation of the brakes. Since the accelerator pedal controlled brake system described hereinbefore functions to supply maximum air pressure to the wheel brakes when the accelerator pedal and the overlay pedal are fully retracted, it will be understood that maximum braking pressure is supplied through line 34 to the wheels when the foot of the driver is completely removed from the accelerator pedal. Such a condition prevails, for example, just prior to shutting down the vehicle engine preparatory to parking. Thus, when the vehicle engine is turned off and the air pressure in the reservoir gradually decreases, the air pressure switch 252 is caused to close when the pressure reaches the predetermined lower value of about 30 p.s.i. The solenoid operated check valve 250 thus is caused to close, thereby sealing the air line 34 against further reduction of air pressure in the actuators 38. This amount of air pressure is sufficient to maintain the wheel brakes set.

Operation

Referring to FIG. 1 of the drawings, starting of the vehicle engine activates the air compressor to build up air pressure in the reservoir 10 to the maximum value. In this condition the air pressure switch 252 is open and the solenoid operated valve 250 opens the line 34 between the relay valve 30 and the brake actuators 38. In the off position of the switching valve 64, the pin 228 is contained within the longitudinal groove 226 of the control shaft 218 and the valve head 234 thus bears against its seat 236 to close the air pressure line 62 from the line 60 leading to the sensing valve 54. When the control shaft 218 is pushed forward and then rotated to confine the pin 228 within the annular groove 224, the valve head 234 is removed from its seat 236 to allow flow of air pressure from air line 62, past the spring 242 and around the valve head 234 into the chamber 210 and thence into the outlet opening and air line 60 to the sensing valve.

With the foot removed from the accelerator overlay pedal 58, the spring 174 urges the overlay pedal 58 away from the main accelerator pedal 20, to its limit of retraction. In this position of the overlay pedal, the cam member 184 is positioned at its limit of counterclockwise rotation, abutting the adjustable stop screw 190. This screw preferably is adjusted to position the cam member in such manner that the location of the roller 182 against the irregular contoured surface 183 limits the position of clockwise rotation of the bell crank lever 170, 178 such that the degree of compression of the sensing valve spring 164 is balanced by a magnitude of air pressure on the opposite side of the stem head 134, and hence at the input of the power unit 50, which limits the depression of the brake pedal 18 to the point at which the magnitude of air pressure supplied to the wheel brakes provides the condition of impending skidding.

When the vehicle is being accelerated, the overlay pedal 58 is in direct contact with the main accelerator pedal 20. In this position of the overlay pedal the link 56 has rotated the cam member 184 clockwise to the position in which the roller engages the constant radius surface 183', thus positioning the bell crank lever 170, 178 at its limit of counterclockwise rotation. In this position of the bell crank lever, the sleeve 156 is at its position of full retraction, either with the shoulder 158 abutting the snap ring 162, or with the roller 166 abutting the bell crank arm 170, whichever adjustment is preferred. In this position of the sleeve, as illustrated, the spring 152 overpowers the main spring 164 and moves the stem 132 and head assembly toward the left (FIG. 3), thereby separating the check seal 140 from its valve seat 142 and venting the controlled chamber 202 to the atmosphere through the hollow stem 132. In addition, the valve seat 146 is seated against its check seal 148, thereby closing the high pressure chamber 194 from the controlled chamber 202.

The position at which the roller 182 just engages the constant radius surface 183' of the cam member 184 is the idle position of the main accelerator pedal. In this position of the accelerator pedal, and throughout the acceleration range of the pedal, the only pressure impressed upon the driver's foot is that of the normal accelerator spring pressure.

As the driver's foot is retracted above the idle position of the main accelerator pedal, the cam member 184 is rotated counterclockwise to bring the roller 182 onto the irregular contoured surface 183. The spring 174 thus tends to rotate the bell crank lever in the clockwise direction, urging the cam member into further counterclockwise rotation against the resistance of the driver's foot which bears upon the overlay pedal 58. In this manner the degree of rotation of the cam member and bell crank lever is controlled by the driver's foot against the overlay pedal.

As the driver's foot is retracted to permit the overlay pedal to retract from the main accelerator pedal, clockwise rotation of the bell crank arm 170 bearing against the roller 166 causes the sleeve 156 to be projected into the sensing valve body 112 (FIG. 3), to the extent determined by the rotation of the bell crank lever. This movement of the sleeve results in corresponding compression of the main spring 164 and contemperaneous movement of the stem 132 and piston head assembly toward the right. This movement of the stem and head results first in the seating of the check seal 140 against its valve seat 142, and then movement of the valve pin 144 toward the right, against the compression of the spring 150, to unseat the valve seat 146 from its check seal 148. In this manner the high pressure chamber 194 is opened to the controlled pressure chamber 202, with the latter isolated from the hollow stem 132 and air exhaust chamber 130. Thus, air pressure from the air line 60 is admitted through the controlled air pressure chamber 202 to the outlet air line 52 to the power unit 50.

When the force of air pressure in the controlled chamber 202 against the seal 136 equals the opposing force exerted by the main spring 164, a state of equilibrium is reached and the spring 150 urges the valve seat 146 into sealing engagement with its check seal 148. This closes the controlled air chamber 202 from the high pressure chamber 196 to limit the magnitude of air pressure to the power unit 50.

This magnitude of air pressure delivered to the power unit acts against the cup seal 102 of the piston 96, forcing the latter toward the left against the compression of the spring 104. This movement of the piston and its attached rod 86, results in simultaneous depression of the vehicle brake pedal 18. Since the air pressure against the piston seal 102 must overcome the opposing forces of the power unit spring 104 as well as the spring which normally loads the vehicle brake pedal, the air pressure supplied to the power unit functions to depress the brake pedal a corresponding amount. This degree of depression of the brake pedal results in a proportionate movement of the air valve control stem 16, thus admitting air pressure from the reservoir 10 to the relay valve 30, in proportion to the setting of the control stem 16. This magnitude of air pressure signal to the relay valve 30 results in a proportionate magnitude of air pressure being supplied to the brake actuators 38, thereby braking the vehicle correspondingly.

When the vehicle is to be parked, for example, the driver removes his foot from the overlay pedal 58, thereby applying maximum air pressure to the wheel brakes. After the vehicle engine has been stopped, the air pressure in the reservoir 10 gradually bleeds off, and when it reaches a predetermined lower value, for example 30 p.s.i., the air pressure switch 252 closes automatically to complete the electric circuit of the solenoid operated check valve 250. This valve thereupon closes and seals the air line 34, thereby sealing the air pressure system of the brake actuators 38 at that predetermined air pressure and setting the wheel brakes to the extent sufficient for parking.

It will be apparent to those skilled in the art that various changes in the structural details and arrangement of parts described hereinbefore may be made without departing from the spirit of this invention and the scope of the appended claims.

Having now described our invention and the manner in which the same may be used, what we claim as new and desired to secure by Letters Patent is:

1. In a fluid pressure brake system including a source of fluid under pressure, brake operating means, conduit means interconnecting the operating means and pressure source, variable control valve means in the conduit means, and movable operating means for the variable control valve means for varying the fluid pressure to the brake operating means; power means operatively connected to the control valve operating means and operable by fluid under pressure to operate the control valve means, sensing valve means, and conduit means connecting the sensing valve means between the power means and pressure source, the sensing valve means including control means operable to regulate the pressure to the power means, whereby to control the operation of the variable control valve means and regulate the degree of fluid pressure to the brake operating means.

2. The system of claim 1 including adjustable switching valve means in the conduit means interconnecting the power means and pressure source and operable in one position of adjustment to seal the pressure source from the power means and to relieve the pressure in the power means.

3. The system of claim 1 including pressure check valve means in the conduit means interconnecting the brake operating means and the pressure source, the check valve means being operable selectively upon reduction of pressure in said conduit to a predetermined magnitude to seal said conduit against further pressure reduction at the brake operating means.

4. The system of claim 1 wherein the sensing valve means comprises a hollow body having therein a fluid pressure source chamber connected to the pressure source, a controlled fluid pressure chamber connected to the power means, and a reference fluid pressure chamber, first valve means between the source chamber and controlled chamber and operable to releasably seal said chambers from each other, second valve means between the controlled chamber and reference chamber and operable to releasably seal said chambers from each other, valve operating means in the controlled chamber and movable therein in one direction to first seal the second valve means and then unseal the first valve means and in the opposite direction to first seal the first valve means and then unseal the second valve means, and adjustable resilient actuating means engaging the valve operating means for moving the latter in said one direction, the valve operating means being movable in said opposite direction against the resistance of the resilient actuating means by a predetermined magnitude of fluid pressure admitted to the control chamber from the source chamber, said predetermined magnitude being regulated by the adjustable resilient actuating means.

5. In a vehicle fluid pressure brake system including a source of fluid under pressure, wheel brake operating means, conduit means interconnecting the operating means and pressure source, variable control valve means in the conduit means, and a brake pedal for operating the control valve means for varying the fluid pressure to the wheel brake operating means: power means connected to the brake pedal and operable by fluid under pressure to operate the control valve means, sensing valve means, and conduit means connecting the sensing valve means between the power means and pressure source, the sensing valve means including control means operable to regulate the pressure to the power means, whereby to control the operation of the variable control valve means and regulate the degree of fluid pressure to the wheel brake operating means.

6. The system of claim 5 wherein the control means includes operating means connected to the accelerator pedal of the vehicle.

7. The system of claim 5 wherein the vehicle has an electric circuit, and including electrically actuated fluid pressure check valve means in the conduit means interconnecting the brake operating means and the pressure source, a fluid pressure operated electric switch in the electric circuit and operable upon reduction of pressure of the fluid pressure source to a predetermined magnitude, to activate the check valve means to seal said conduit against further pressure reduction at the brake operating means.

8. The system of claim 5 including adjustable limit means operable to regulate to a predetermined value the maximum pressure to the power means for controlling the wheel braking effort to the condition of impending skidding.

9. The system of claim 5 wherein the sensing valve means comprises a hollow body having therein a fluid pressure source chamber connected to the pressure source, a controlled fluid pressure chamber connected to the power means, and a reference fluid pressure chamber, first valve means between the source chamber and controlled chamber and operable to releasably seal said chambers from each other, second valve means between the controled chamber and reference chamber and operable to releasably seal said chambers from each other, valve operating means in the controlled chamber and movable therein in one direction to first seal the second valve means and then unseal the first valve means and in the opposite direction to first seal the first valve means and then unseal the second valve means, and adjustable resilient actuating means engaging the valve operating means for moving the latter in said one direction, the valve operating means being movable in said opposite direction against the resistance of the resilient actuating means by a predetermined magnitude of fluid pressure admitted to the control chamber from the source chamber, said predetermined magnitude being regulated by the adjustable resilient actuating means.

10. The system of claim 9 wherein the vehicle has an accelerator pedal and the adjustable resilient actuating means of the sensing valve means includes an abutment member mounted movably on the body, spring means interengaging the abutment member and the valve operating means, a bell crank member having one arm engaging the abutment member, a pivoted cam member having one end contoured with a constant radius section and an irregular curved section and arranged for engaging said one end of the other arm of the bell crank member, an auxiliary brake pedal mounted on the vehicle accelerator pedal, link means interconnecting the auxiliary pedal and the cam member, and adjustable stop means arranged for abutment by the cam member for limiting the movement of the valve operating means in said one direction, whereby to control the wheel braking effort.

11. In a vehicle air pressure brake system including a source of air under pressure, wheel brake operating means, conduit means interconnecting the operating means and pressure source variable control valve means in the conduit means, and a brake pedal for operating the control valve means for varying the air pressure to the wheel brake operating means: power means connected to the brake pedal and operable by air under pressure to operate the control valve means, conduit means interconnecting the air pressure source and power means, sensing valve means in the conduit means interconnecting the power means and pressure source and operable to regulate the pressure to the power means, whereby to control the operation of the variable control valve means, and sensing valve control means connected to the sensing valve means and arranged for operation from the position of the accelerator pedal of the vehicle.

12. The system of claim 11 wherein the vehicle has an electric circuit, and including electrically actuated air pressure check valve means in the conduit means interconnecting the brake operating means and the pressure source, an air pressure operated electric switch in the electric circuit and operable upon reduction of pressure in the air pressure source to a predetermined magnitude to activate the check valve to seal said conduit against further pressure reduction at the brake operating means.

13. In a vehicle air pressure brake system including a source of air under pressure, wheel brake operating means, conduit means interconnecting the operating means and pressure source, variable control valve means in the conduit means, and a brake pedal for operating the control valve means for varying the air pressure to the wheel brake operating means: power means connected to the brake pedal and operable by air under pressure to operate the variable control valve means, an air pressure sensing valve comprising a hollow body having therein an air pressure source chamber connected to the pressure source, a controlled air pressure chamber connected to the power means, and a reference air pressure chamber, first valve means between the source chamber and control chamber and operable to releasably seal said chambers from each other, second valve means between the controlled chamber and reference chamber and operable to releasably seal said chambers from each other, valve operating means in the controlled chamber and movable therein in one direction to first seal the second valve means and then unseal the first valve means and in the opposite direction to first seal the first valve means and then unseal the second valve means, an abutment member mounted movably on a body, spring means interengaging the abutment member and the valve operating means, a bell crank member having one arm engaging the abutment member, a pivoted cam member having one end contoured with a constant radius section and an irregular curved section and arranged for engaging said one end of the other arm of the bell crank member, an auxiliary pedal mounted pivotally on the vehicle accelerator pedal and overlying the latter, link means interconnecting the auxiliary pedal and the cam member, and adjustable stop means arranged for abutment by the cam member for limiting the movement of the valve operating means in said one direction, whereby to control the wheel braking effort, the valve operating means being movable in said opposite direction against the resistance of the spring means by a predetermined magnitude of air pressure admitted to the control chamber from the source chamber, said predetermined magnitude being regulated by the position of the auxiliary pedal.

14. An adjustable fluid pressure switching valve comprising a hollow body having fluid pressure inlet, outlet and exhaust openings therein, valve means in the body and movable therein between one position of adjustment sealing the inlet and outlet openings from each other and another position of adjustment unsealing the inlet and outlet openings for communication with each other, sealing means on the valve means arranged to unseal the outlet and exhaust openings for communication with each other when the valve means is in said one position of adjustment and to seal the exhaust opening from the inlet and outlet openings when the valve means is in said other position of adjustment, and a guide pin on a body slidably engaging a guide groove in the valve means, the guide groove including an annular portion and a longitudinal portion intercepting the annular portion.

15. A fluid pressure sensing valve comprising a positive hollow body having therein a fluid pressure source chamber and an inlet therefor, a controlled fluid pressure chamber and an outlet therefor, and a reference fluid pressure chamber for a reference fluid pressure of lower magnitude than the positive fluid pressure, first valve means between the source chamber and controlled chamber and operable to releasably seal said chambers from each other, second valve means between the controlled chamber and the reference chamber and operable to releasably seal said chambers from each other, valve operating means in the controlled chamber and movable therein in one direction to first seal the second valve means and then unseal the first valve means and in the opposite direction to first seal the first valve means and then unseal the second valve means, and adjustable resilient actuating means engaging the valve operating means for moving the latter in said one direction, the valve operating means being movable in said opposite direction against the resistance of the resilient actuating means by a predetermined magnitude of fluid pressure admitted to the controlled chamber from the source chamber, said predetermined magnitude being regulated by the adjustable resilient actuating means.

16. An adjustable fluid pressure switching valve comprising a hollow body having fluid pressure inlet, outlet and exhaust openings therein, valve means in the body and movable longitudinally therein between one position of adjustment sealing the inlet and outlet openings from each other and another position of adjustment unsealing the inlet and outlet openings for communication with each other, sealing means on the valve means arranged to unseal the outlet and exhaust openings for communication with each other when the valve means is in said one position of adjustment and to seal the exhaust opening from the inlet and outlet openings when the valve means is in said other position of adjustment, locking means releasably interengaging the body and valve means for securing the latter in said other position of adjustment, and a head on the valve means disposed adjacent the fluid pressure inlet, whereby the fluid pressure functions to exert pressure on the head to urge the valve means to said one position of adjustment automatically upon release of the locking means.

References Cited in the file of this patent
UNITED STATES PATENTS

| | | |
|---|---|---|
| 2,051,906 | Sandford | Aug. 25, 1936 |
| 2,152,098 | Sandford | Mar. 28, 1939 |
| 2,152,949 | Borde | Apr. 4, 1939 |
| 2,364,750 | Peters | Dec. 12, 1944 |
| 2,551,445 | Lindsay et al. | May 1, 1951 |
| 2,626,026 | Sherwood et al. | Jan. 20, 1953 |
| 2,682,386 | Lindsay | June 29, 1954 |
| 2,823,699 | Willis | Feb. 18, 1958 |
| 2,833,162 | Forster | May 6, 1958 |
| 2,846,845 | Parker | Aug. 12, 1958 |
| 2,871,999 | Hemphill | Feb. 3, 1959 |
| 2,937,622 | Brimhall | May 24, 1960 |
| 2,960,969 | Hershman | Nov. 22, 1960 |
| 2,980,062 | Ohle | Apr. 18, 1961 |